United States Patent [19]

Barraclough et al.

[11] Patent Number: 5,553,073
[45] Date of Patent: Sep. 3, 1996

[54] TOKEN RING NETWORK

[75] Inventors: Keith Barraclough, Romsey; Peter Cripps, Locks Heath Southampton; Adrian Gay, Fareham; Alan Jones, Eastleigh, all of United Kingdom

[73] Assignee: IBM Corporation, Armonk, N.Y.

[21] Appl. No.: 474,826

[22] Filed: Jun. 7, 1995

Related U.S. Application Data

[63] Continuation of Ser. No. 245,092, May 17, 1994, abandoned.

[30] Foreign Application Priority Data

May 17, 1993 [GB] United Kingdom ............... 9310119

[51] Int. Cl.$^6$ ........................................... H04L 12/42
[52] U.S. Cl. ................................. 370/85.5; 370/85.6
[58] Field of Search ................................ 370/85.1, 85.4, 370/85.5, 85.6, 85.12, 85.13, 85.15, 94.2, 85.7, 84; 340/825.5, 825.51

[56] References Cited

U.S. PATENT DOCUMENTS

| | | | |
|---|---|---|---|
| 4,340,961 | 7/1982 | Capel et al. | 370/84 |
| 4,404,557 | 9/1983 | Grow | 370/84 |
| 4,459,588 | 7/1984 | Grow | 340/825.05 |
| 4,675,812 | 6/1987 | Capowski et al. | 364/200 |
| 5,276,682 | 1/1994 | Van As et al. | 370/85.5 |

OTHER PUBLICATIONS

European Search Report.

Primary Examiner—Wellington Chin
Assistant Examiner—Huy D. Vu
Attorney, Agent, or Firm—Jeanine S. Ray-Yarletts

[57] ABSTRACT

A token ring local area network includes workstations running both conventional data and multimedia applications. The latter, which generally requires a minimum throughput in order to be viable, can be split into two further categories; those which cannot tolerate excessive latency (end to end delay), typically interactive applications such as voice communications, and those which are less sensitive to latenoy, typically playback operations, the network recognises three priority levels: (1) for latency-sensitive multimedia applications, (2) for latency-insensitive multimedia applications, and (3) conventional applications. All multimedia applications prior to commencement of any communications over the LAN must request an allocation of throughput from a LAN segment resource manager (LSRM), which will only be awarded if there is currently sufficient available throughput on the LAN to support the attended communication. Furthermore, first priority level applications are also given a maximum token holding time, thereby ensuring rapid circulation of the token, and controlling latency.

9 Claims, 3 Drawing Sheets

TOKEN RING NETWORK

This is a continuation of application Ser. No. 08/245,092, filed May 17, 1994, now abandoned.

The present invention relates to the control of data communications on a token ring local area network, particularly in relation to multimedia applications.

Local area network (LANs) used for connecting computer workstations together are widely discussed in the various textbooks, eg "A LAN Primer" by G. Nunemacher, 1990, Prentice Hall, "LANs Explained" by W. Scott Currie, 1988, Ellis Horwood, or "Local Area Networks" by J. Martin, 1989, Prentice Hall. One common form of LAN is a token ring system, and is the subject of the IEEE 802.5 standard. The basic principle of operation of a token ring is that the nodes or workstations in the LAN are logically configured into a ring, and a "token" is circulated around the ring. If a workstation wishes to send a message to another node in the ring, it must wait until it receives the token. The message is then sent around the ring to the destination node, which modifies the message to acknowledge receipt. The message is then returned to the source node, which releases the token, ie starts the free token circulating around the ring again.

The IEEE 802.5 Standard includes a priority system, according to which messages on the token ring can be assigned one of eight priority levels (from 0–7). The token contains a three-bit priority field and a three bit reservation field. As an example of the operation of the priority system, suppose a node (node A) requires access to the network at a priority level of say 4 whilst a message is currently being transmitted by another node. Node A sets he reservation field in the token accompanying the passing message (this token is not free and so cannot be used per se to send a message) to a value of 4 (providing the previous value in the reservation field was less than 4 ). The source node of the current message, when it releases a free token, then sets the priority field to 4 and the reservation field back to its original value. As the token now circulates, only nodes wishing to transmit at priority level 4 (or higher) are allowed to obtain the free token. Thus any competition for the token is now reduced to between nodes requiring service at priorty level 4 or higher (note that is no particular preference to node A). Once node A has transmitted its message, and providing any high priority level requests from other nodes have also been satisfied, node A lowers the priority level in the token back to its original value.

Under the current priority system, priority levels 0–3 are assigned for the normal user data, plus control frames for media access control in accordance with the IEEE 802.5 standard, whilst level 4 is assigned to bridge/router messages. Priority levels 5 and 6 have not been allocated, whilst priority level 7 (the highest) is assigned to specialised station management. The amount of priority level 7 traffic is generally very small, and for the purposes of this application can be regarded as negligible. The priority mechanism is described in more detail in the references listed above. It should be appreciated that to date it has not been greatly utilised in most token ring implementations.

The design of LANs has been optimised primarily to transfer data files or programs between nodes on the LAN. For example, a workstation might send a document to a shared printed, or access a program or database on a LAN file server. Such operations are not time critical. In that delays of the order of a couple of seconds are quite tolerable. Furthermore, the majority of LANs do not run at maximum capacity, in that they have unutilised bandwidth for most of the time.

However, there is growing interest in the use of LANs to transmit multimedia data, such as voice and video, between nodes. Such new applications can place much more stringent demands on the LAN, in particular as regards bandwidth and latency. For example, even compresses video signals can easily require data rates in excess of 1 Mbits/second, whilst interactive voice applications, although less demanding in terms of bandwidth, require network latency of no more than about 100 ms in order for a natural two way conversation to be feasible. With current token ring implementations, there is no way of guaranteeing that such conditions will be met.

One attempt at resolving the problems of sending eg voice on a token based network is described in U. S. Pat. No. 4,459,588. In the system described therein, a target token rotation time (TTRT) is set, which represents the maximum time that any node must wait for receipt of the token (eg this could be set to the 100 ms latency referred to above). High priority application (eg voice), referred to as Class 1 , can transmit for a specified fraction of the TTRT each time they receive the token. This fraction is set by determining (i) the total proportion of the TTRT to be allocated to Class 1 applications vis-a-vis other applications, such as normal data transfer on the LAN, and (ii) the proportion of the Class 1 allocation of the TTRT currently allocated to other nodes. Note that controlling the length of time for which any ne application can transmit is effectively limiting the bandwidth available to that application.

U. S. Pat. No. 4,459,588 has a relatively complicated timer system to ensure that Class 1 applications receive bandwidth ahead of lower priority applications. This mechanism is not included in the IEEE 802.5 standard, which has been widely adopted throughout the industry, so that it is now very difficult to apply this approach whilst maintaining compatibility with current implementations. Furthermore, controlling the transmission time limits the frame size, which can load to reduced transmission efficiency. This is because there are certain fixed overheads associated with each frame, and as the frame size is reduced, these overheads become proportionately more and more significant.

Thus there is a need for a control mechanism for a token ring LAN that provides efficient and effective handling of multimedia data.

Accordingly, the invention provides a method of operating a token ring local area network, in which a plurality of nodes are arranged in a ring configuration, a node communicating by sending a transmission over the network when it has control of the token, the network supporting at least three priority levels of communication, designed first, second and third in decreasing order of importance, the network including a LAN segment resource manager (LSRM) for maintaining information about the first and second priority level communications currently in progress, the method including the steps of:

assigning maximum throughput allocations to the three priority levels, and storing said allocations in the LSRM;

sending a request from a node to the LSRM for permission to commence a first or second priority level communication, together with the desired throughput allocation;

determining at the LSRM whether or not to award the requesting node the desired throughput allocation, dependent on the currently available throughput, and responding accorsingly to the requesting node;

determining at the LSRM, for first priority level communications, the maximum time for which the requesting node can retain control the token for a single transmission before release of the token, and responding accordingly to the requesting node;

recording at the LSRM any new allocation of throughput; and commencing communications at the requesting node in accordance with the response from the LSRM.

The invention recognises that some multimedia applications, particularly the interactive ones, demands low latency and guaranteed bandwidth, whilst others, such as playback applications, normally only require a guaranteed bandwidth (the invention is also applicable to any other applications with similar requirements, even if not multimedia). These two classes of application are assigned first and second priority levels respectively. Conventional token ring applications are assigned a third priority level, the lowest (in a preferred embodiment, the first level corresponds to priority 6 of the IEEE 802.5 standard, the second priority level corresponds to priority 5 of this standard, and the third priority level in fact corresponds to priority 0–4 of this standard, although these can be regarded as a single level for the purposes of the present invention).

Before they start communications, first and second priority level applications must request throughput from the LSRM, which maintains a record of the available throughput on the LAN. If there is sufficient available throughput, the LSRM can grant the request, otherwise it will reject the request. Alternatively, it may offer the node less throughput than was originally requested. The node can either accept this offer, and eg switch from colour to black and white transmissions, a lower frame transmission rate, or sound only communications, or decide to postpone the attempted communication session. Some embodiments may decide not to support a partial allocation (ie the LSRM either allocates all the requested throughput, or none at all). The LSRM may maintain separate shares of throughput for first and second priority level communications, or alternatively may not distinguish between the two (ie allocate throughout for both of them from a common pool).

The above approach provides several advantages over prior art implementations. Firstly, a limited number of multimedia applications can be provided with guaranteed throughput, rather than an uncontrolled scramble clogging up the LAN which then fails to adequately service any application. Secondly, stringent latency requirements for particular applications can be supported by running these at the highest (first) priority level. It should be noted that irrespective of whether any first priority level applications are running, then the second priority level applications run without extra restrictions on frame size, (in contrast to the situation in U.S. Pat. No. 4,459,588), maximising transmission efficiency. Thus a second priority level application may only obtain the token when not required by a first priority level application, but when it does obtain the token, it may retain control of the token for the full 10 ms allowed by the IEEE 802.5 standard. Thirdly, the above benefits are achieved without any modifications to conventional applications, providing full compatibility with existing software.

It is preferred that the nodes send a notification to the LSRM when any first or second priority level communication for that node has completed, thereby allowing the LSRM to update its records accordingly, and reassign the throughput allocation from the completed communication session. It is also preferred that the LSRM monitors communications on the token ring, and compares the results with the recorded throughput allocations to verify that nodes are adhering to their throughput allocations. Such a regulatory role for the LSRM is important, since the proposed network management system relies upon nodes conforming to the instructions from the LSRM. If the LSRM detects any unauthorized communications, then it can alert the network operator to take remedial action.

In a preferred embodiment, any node supporting first and/or second priority level communications in addition to third priority level communications maintains two queues of data to be transmitted, one for first and/or second priority level communications, and the other for third priority level communications. The use of two queues allows the multimedia data streams to be separated from the data streams of conventional applications, allowing easier control of both. The presence of the multimedia applications is essentially transparent to the conventional applications, thus allowing existing conventional applications to continue operating without modification.

It is also preferred that the LSRM reserves at least a certain portion of the total available throughput for priority level three communications to ensure that the first and/or second priority level multimedia applications do not prevent traditional LAN activities. One convenient method of selecting a suitable allocation for priority level three applications is to look at the average LAN utilisation when no multimedia applications are running (a typical figure would be 30%), and reserve this for priority level three applications. It should be appreciated that there is no need for priority level three applications to explicitly request this throughput; rather the LSRM limits the throughput allocations of the first and second priority levels (to 70 % in this case).

In a preferred embodiment, each node transmitting first or second priority level communications includes a local segment access agent (LSAA) to perform the steps of: assigning an identifier to each application at the node that has been granted a throughput allocation for first or second priority level communications; and monitoring outgoing first or second priority level communications to verify that they are associated with a correctly assigned identifier.

the LSAA, which can be implemented for example as a Network Driver Interface Specifications socket between the Media Access Control layer and the Logical Link Control layer (as defined by the IEEE 802 standards section), effectively provides the interface between a multimedia application and the network (including the LSRM), avoiding the need for the multimedia applications to know how to interact with the LSRM.

It is also preferred that the LSAA monitors outgoing first priority level communications to ensure that any application at the node makes only one first priority level transmission within a predetermined maximum network latency period. Thus the LSAA effectively acts as a LAN segment monitor at each node to prevent a first priority level application seizing more that its allocated share of throughput. An alternative approach would be to trust to the fact that most multimedia applications such as voice and video generate data at a fixed, predetermined rate, and so will naturally adhere to their throughput allocation. However, use of the LSAA offers a more secure and reliable control method.

The invention also provides apparatus for operating a token ring local area network, in which a plurality of nodes are arranged in a ring configuration, a node communicating by sending a transmission over the network when it has control of the token, the network supporting at least three priority levels of communication, designated first, second and third in decreasing order of importance, the apparatus including a LAN segment resource manager (LSRM) for maintaining information about the first and second priority level communications currently in progress, means for assigning maximum throughput allocations to the three priority levels, and storing said allocations is the LSRM;

means for sending a request from a node to the LSRM for permission to commence a first or second priority level communication, together with the desired throughput allocation;

means for determining at the LSRM whether or not to award the requesting node the desired throughput allocation, dependent on the currently available throughput, and responding accordingly to the requesting node;

means for determining at the LSRM, for first priority level communications, the maximum time for which the requesting node can retain control of the token for a single transmission before release of the token, and responding accordingly to the requesting node;

means for recording at the LSRM any new allocation of throughput; and means for commencing communications at the requesting node in accordance with the response from the LSRM.

An embodiment of the invention will now be described by way of example with reference to the following drawings.

Figure 1:
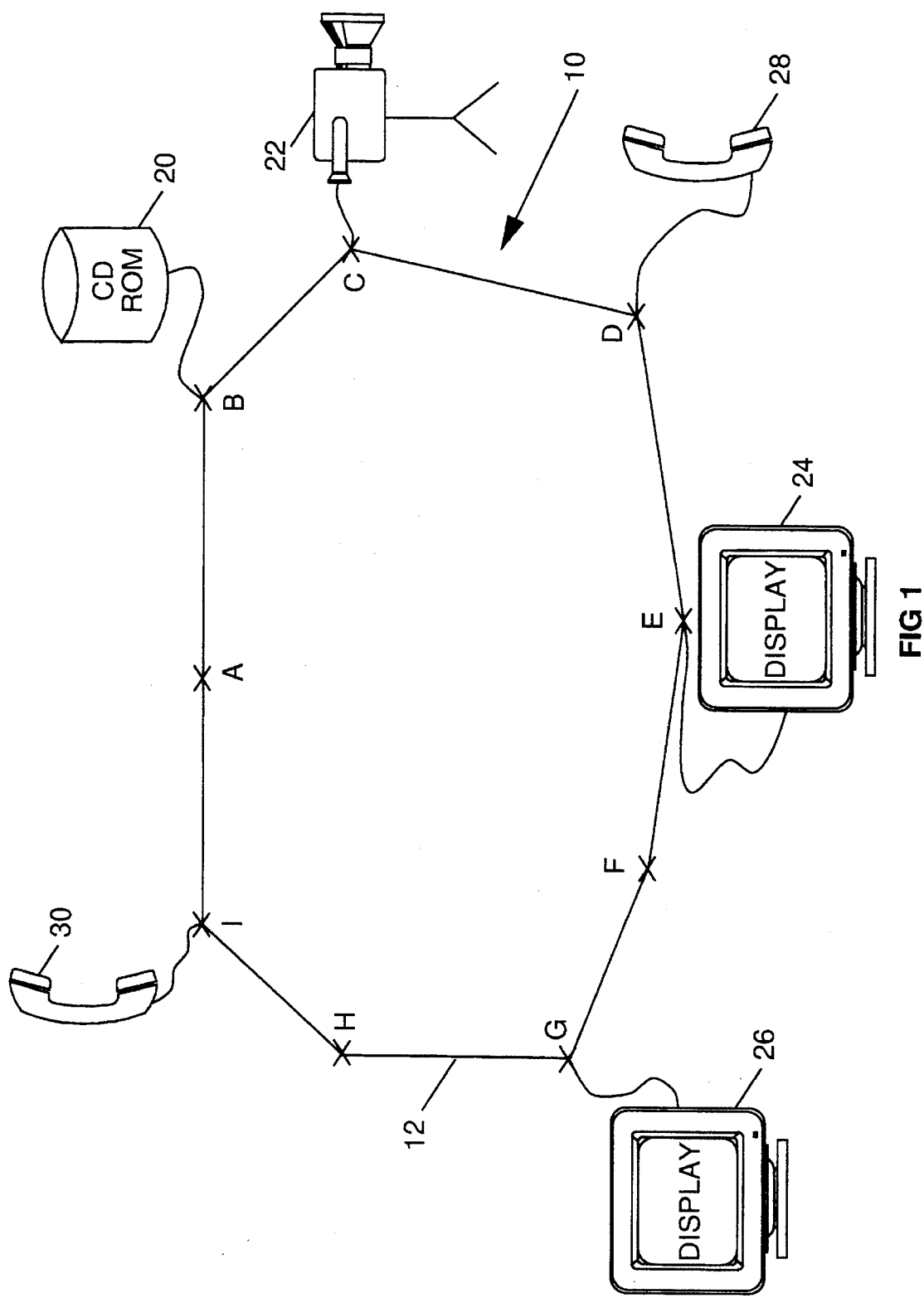
FIG. 1 is a schematic illustration of a token ring LAN used for multimedia applications.

FIG. 1 is a schematic illustrations of a token ring LAN 10, configured in accordance with the IEEE 802.5 standard—ie it contains no more than 255 nodes, and the bandwidth of the network is either 4 or 16 MBits/second. As actually shown, the network comprises nodes A–I and the links have a bandwidth of 16 MBits/second. Transmission over the LAN (ie media access) is controlled by passing a token around the ring 12: only the node currently in possession of the token may transmit onto the ring. Once transmission has been completed (with due acknowledgement of receipt) the sending node must release the token for use by another node. The time required for a signal to physically circulate around the ring is very small, and is in fact negligible in most circumstances.

The LAN of FIG. 1 is to be utilised for multimedia communications, in particular two video applications and one voice application (it should be appreciated that this arrangement is for example only and many other possibilities exist). Node B includes a CD ROM player 20 storing video signals, which are to be played back on the display 26 at node G. Nodes C and E, equipped with a video camera 22 and display 24, are participating in a video conference—normally this will be two-way, so that C will also have a display and E a camera (now shown). Nodes I and D are communicating using a voice application (depicted by two telephones 28, 30, but any suitable hardware could be used). The remaining nodes utilise the LAN for conventional data transfer of files, email, and so on.

Although the individual links are specified by the IEEE 802.5 standard as having a bandwidth of 16 MBits/second, this bandwidth is only available to a node when that node is in possession of the token. Thus during intervals when the node owns the token the available bandwidth is 16 MBits/second (for this network), but the available bandwidth drops to zero when the node does not own the token.

In accordance with the IEEE 802.5 standard, a node can only retain the token for 10 ms at most, before it must pass the token on to the next node. This corresponds to a maximum transmission of 160 kbits. If more data is to be transmitted, the node must wait for the token to return around the ring. Clearly the net data rate that a node can actually sustain therefore depends on the proportion of time that the node is in possession of the token. The term "throughput" will be used to denote the long-term average data rate that a node can expect, "bandwidth" being used for the fixed instantaneous value of either 0 or 16 MBits/second (this distinction is often not observed, with "bandwidth" being used to cover both cases).

The throughput available for any given node can therefore be expressed as $k.16$ Mbits/second, where $k$ is the fraction of time that the node holds the token. If there are 250 nodes in a ring, $k$ can theoretically be as low as 0.004, resulting in a throughput of only 64 kbits/second. This worst case assumes that each node has a full 160 kbits of data to transmit when it receives the token. Although 64 kbits/second is sufficient for voice, it is inadequate to provide even very low quality video.

It is clear therefore that a conventional LAN cannot guarantee every node the necessary throughput required by multimedia applications (video especially). The present invention recognises the fact that it is preferable to limit the number of video communications sessions current at any one time to ensure that they are all of acceptable quality, rather than have an uncontrolled number, all of such poor quality as to be worthless.

This is achieved by the introduction of a LAN segment resource manager (LSRM), depicted as residing at node A, which maintains a record of current multimedia communications sessions. Before multimedia application can commence a new communications session which requires a high throughput or low latency (ie use of a high priority token), it must reserve the necessary throughput with the LSRM. If there is no available throughput, the multimedia application cannot commence the session.

As mentioned in the introduction, an important aspect is to maintain compatibilty with already existing LAN software. Thus whilst it is feasible to ensure that new multimedia applications do indeed cooperate with the LSRM, such a requirement cannot be imposed retrospectively on existing applications (eg file transfer, and so on). Thus there is a risk that existing applications will compete for throughput with the multimedia appplications rendering the latter ineffective. In order to avert this danger, the LAN of FIG. 1 utilises the priority mechanism of the IEEE 802.5 standard. Conventional applications use priority levels 0–4 as they have traditionally done, whilst multimedia applications are allowed to use priority levels 5 and 6.

The outcome of this priority allocation is that the conventional applications cannot gain access to the token to transmit if a higher priority multimedia application has indicated its desire to transmit. In this manner, the multimedia applications are ensured their allocated bandwidth ahead of conventional applications, without need to modify the conventional applications (for present purposes we can ignore any priority level 7 traffic which is very low in volume).

Of course, there is now a risk that the priority mechanism operates to deny any throughput at all to the conventional applications. Whilst such applications are generally very tolerant of delay, it would clearly be unacceptable for normal use of the LAN to be completely halted. Thus the LSRM will normally not assign the total throughput available to the high priority (class 5 and 6) multimedia applications, but retain some for use by the lower level priority levels. A typical approach would be to monitor the average LAN utilisation of the conventional applications (say 30%), and then assign the remaining throughput (ie 70%) as the maximum allocation to the multimedia applications at the highest priority levels. The practical outcome of such an approach is that are regular intervals data for transmission from the multimedia applications will have been exhausted, so with no outstanding class 5 or 6 request, the network will be able to service the lower priority conventional applications.

The use of the LSRM in conjunction with higher priority levels for multimedia data solves the problem of throughput allocation whilst maintaining compatibility with conventional applications. However, another important consideration, namely latency, has not so far been addressed. As mentioned earlier, in voice conversations, a latency or end-to-end delay of no more than typically 1 ms is required in order to allow a natural conversation to proceed. Under the current version of the IEEE 802.5 standard, which permits each of the 250 LAN nodes to retain the token for up to 10 ms, the maximum delay between successive visits of the token to any particular node is 2.5 seconds. Such a delay would clearly make any attempt at natural conversation impossible.

The use of the priority mechanism described above is of limited assistance to the problem of latency, since now the maximum delay is only 10 ms times the number of multimedia applications running at priority 5 or 6. However, it still only needs ten such multimedia applications to run before the latency starts to increase over the 100 ms value. By comparison, the available throughput of a 16 MBits/second LAN can theoretically support over a hundred voice communication sessions, which would easily result in unacceptable delays.

The invention addresses the problem of latency by recognizing that there are two classes of multimedia communications, and allocating them different priority levels. The first class, which are allocated priority 5, require a guaranteed throughput, but are not particularly sensitive to latency. A typical example of such a communication would be the video playback session between nodes B And G as shown in FIG. 1. In such an application, a couple of seconds of data can be stored in a buffer at node G, resulting in a corresponding start-up delay (quite acceptable from the perspective of the user). After this start up delay, the video play-out as viewed at G will be continuous, in view of the guaranteed throughput allocation and token circulation time.

The second class of applications are those for which latency is important, typically voice communications as shown in FIG. 1 between D and I, but also for example a video conferencing link or applications using a shared pointer. These applications are assigned the highest priority (priority level 6). It should be appreciated that this split of priority levels does not by itself guarantee a low latency since there may be a significant number of priority 6 applications: for example, as mentioned above the throughput on a LAN may be sufficient to support over a hundred simultaneous voice conversations.

In order to overcome latency problems thereof, when an application requests a priority 6 communication session from the LSRM, the LSRM determines and returns to the application a maximum token holding time, which may be less than the 10 ms of the IEEE 802.5 standard. The time period is chosen to ensure that the maximum token circulation time amongst the priority 6 applications is less than the desired maximum latency (eg 100 ms). The simplest way to ensure this is to set the maximum holding period to the desired maximum latency divided by the maximum number of nodes (eg for 250 nodes and a desired maximum latency of 10 ms, this corresponds to a maximum token holding time of 0.4 ms). The main drawback with this approach is that it limits the frame size of any priority 6 message (to 6.4 kbits for a 16 Mbits/second link), and in view of the fixed overheads per frame, this reduces the transmission efficiency. Therefore, it is preferred that the LSRM adopts a more sophisticated approach, and determines the maximum holding period according to how many other priority level 6 applications are active.

The process of throughput allocation is essentially the same for both pirority level 5 and 6 applications—ie a request for throughput is made to the LSRM, which may deny or grant the request, in whole or in part. For some networks it may be desirable to reserve fixed proportions of the total available throughput for priority 5 and priority 6 respectively, but often there will just be a combined allocation to multimedia applications, with the remaining throughput available to conventional applications. The interaction between the priority level 5 and 6 applications is essentially the same as between the multimedia and conventional applications. Thus the priority level 5 applications will be able to transmit during intervals when none of the priority level 6 applications have data for service. Such integrals are guaranteed to occur providing the LSRM has not over-allocated the available throughput.

Figure 2:
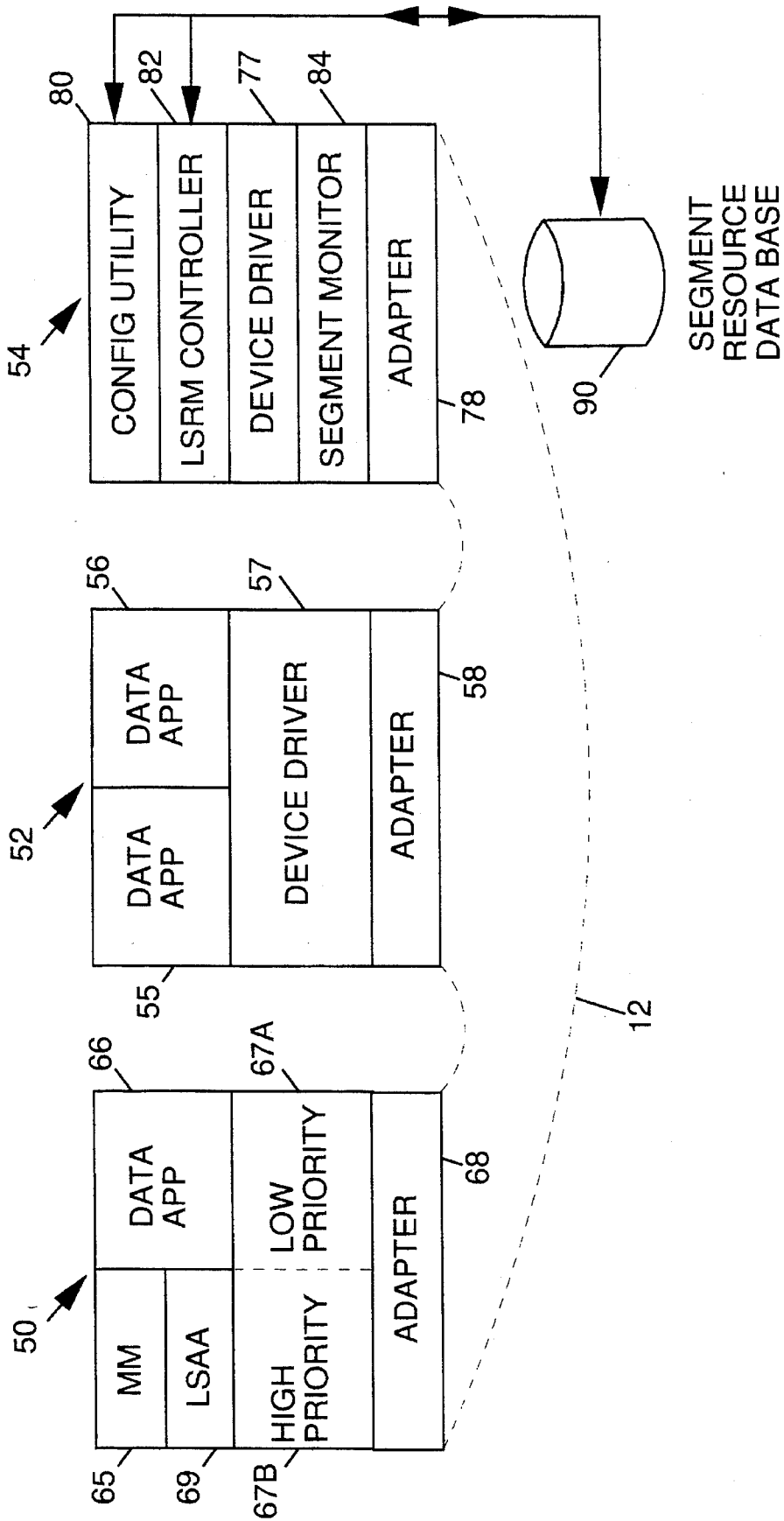
FIG. 2 is a block diagram of selected nodes from the token ring LAN of FIG. 1.

FIG. 2 is a schematic block diagram of selected nodes from the token ring of FIG. 1. Computer workstation X, corresponding to node H in FIG. 1, is running only conventional applications (ie no multimedia applications). The workstation contains the appropriate adapter card to support token ring communications. Applications send and receive data from the adapter card via an appropriate device driver (low level code running on the workstation), and a transport layer, which is responsible for implementing the desired communications protocol (eg TCP/IP or NETBIOS). Computer workstation X is well-known in the prior art, and can continue to operate without any modifications, despite the inclusion of multimedia applications on the LAN.

Computer workstation 5 is running a multimedia application, plus a conventional data application. The multimedia application includes a local segment access agent (LSAA) 69, such that whenever the application desired to perform multimedia communications over the token ring, the LSAA generates a message to send to the LSRM (this message can be sent in conventional fashion—ie at a low priority). According to the response from the LSRM, the LSAA may permit the multimedia application to commence communications, or may report that the requested throughput allocation has been denied.

In computer workstation 50 the device driver and adapter card (more particularly the microcode on the adapter card) have been modified from those of computer workstation 52 in order to be able to support concurrent multimedia and conventional data applications (as multimedia applications become more pervasive then such device drivers and adapter cards are likely to become the norm). In particular, there are now two queues of data for transmission (as indicated by the split of the device driver into two portions 67A, 67B).

Figure 3:
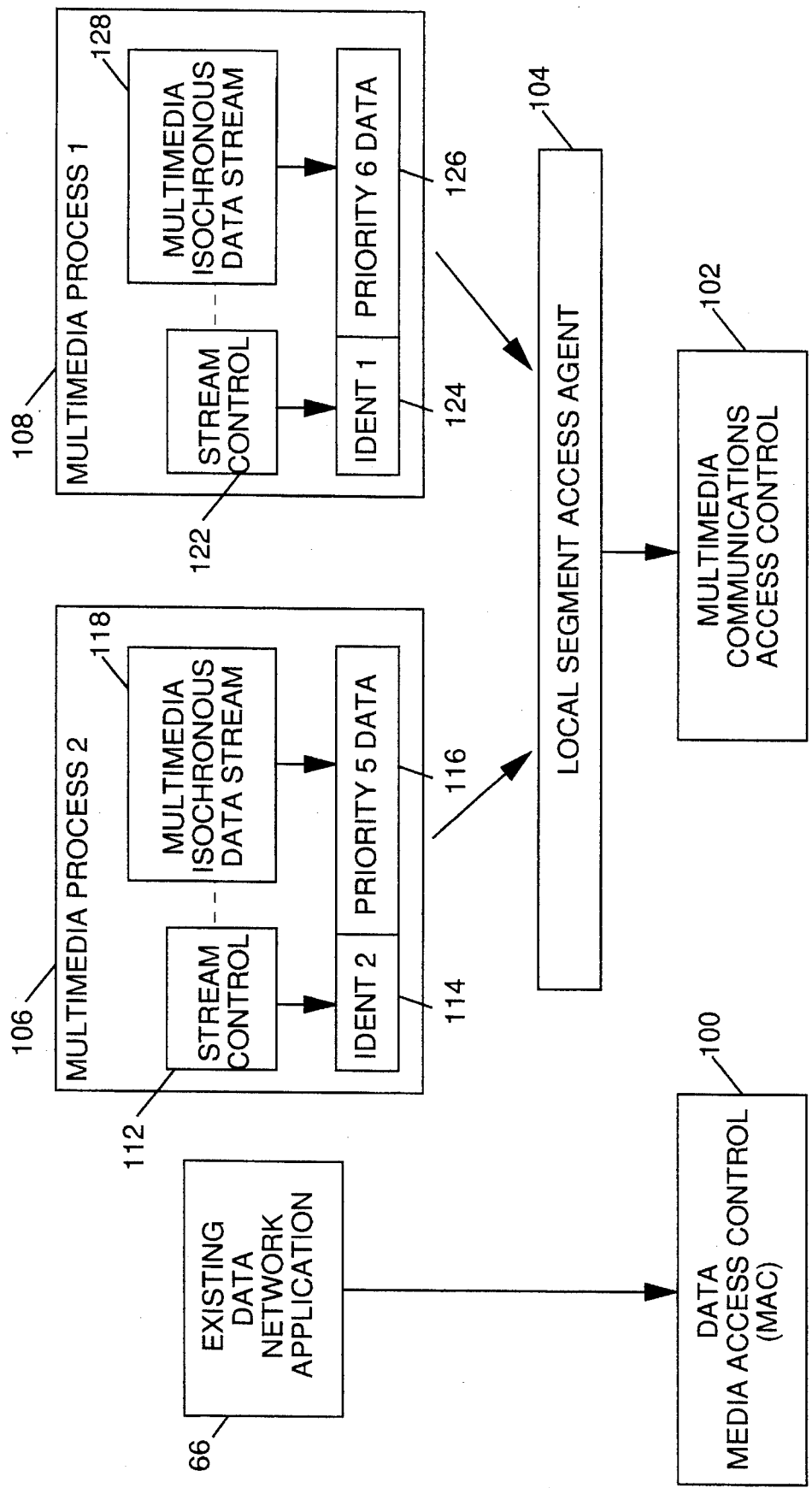
FIG. 3 is a more detailed schematic diagram of a multimedia workstation.

FIG. 3 is a more detailed schematic diagram of multimedia computer such as that shown in FIG. 2. An existing application 66 continues to operate in the normal way, passing data to the media access control unit 100 residing on the LAN adapter (the device drivers have been omitted from FIG. 3 for clarity). Workstation 50 also supports two multimedia applications 106, 108, one a priorty 5 application, and one a priority 6 application. As stated above, when these desire to start communications, they inform the LSAA which makes an appropriate request to the LSRM. Assuming that the desired bandwith allocation is granted, and (for the priority 6 application), the maximum transmission time specified, the LSAA returns to each multimedia application an identifier 114, 124.

The LSAA is then responsible for ensuring that the multimedia applications adhere to the criteria specified by the LSRM. One aspect of this is that the stream control unit 112, 122 for each multimedia application associates the above-mentioned identifiers with each data frame 110, 126. This allows the LSAA to detect any data from multimedia applications that have not received permission to transmit from the LSRM.

The LSAA performs a further policing role with respect to priority 6 applications. The LSRM informs the LSAA of the current maximum latency time (T), as well as the maximum token holding time, t, for that node, which for a given LAN bandwidth is equivalent to a maximum frame size. The LSAA then ensures that any priority 6 application is only allowed one transmission in every interval of T, as well as that the transmission is no larger than the specified maximum frame size. Thus the LSAA can prevent any priority 6 application exceeding its throughput allocation. In fact, since the timers that are used to count T at each node are not synchronized, a degree of skew will develop between them. In such circumstances it is sensible to limit the priority level 6 allocation to no more than 50% of the total available throughput, in order to avoid timing problems.

Returning to FIG. 2, the LSRM itself resides on computer workstation 54 at node A. Although for simplicity no applications are shown for computer workstation 54, there is no reason why it could not also be running conventional or multimedia applications. As with the other nodes, the computer workstation 54 includes a device driver 77 and adapter card 78. The LSRM also includes a segment resource database 90 (this could either be physically resident on workstation 54, or maintained on a file server elsewhere in the LAN, as is well-known in the art). the segment resource database maintains a list of current multimedia communication sessions, the network addresses of the participating nodes, the allocated bandwidths, and whether they are priority level 5 or priority level 6 applications.

The segment resource database interacts with two components, a configuration utility 80 and a LSRM contoller 82. The latter is responsible for receiving requests from nodes for throughput allocations (and maximum token holding times if appropriate), interrogating the segment resource database as to the current status of the LAN, and generating the response to the requesting node. The LSRM controller is likewise responsible for receiving messages indicating the conclusion of a multimedia communications session, and passing the information on to the segment resource database to update its records accordingly.

The configuration utility allows the network operator to control various aspects of the LSRM, such as the maximum throughput allocation to priority level 5 and 6 applications by setting appropriate parameters in the LSRM. It is also possible for the configuration utility to influence the allocation to individual nodes, for example, perhaps reserving throughput for a particular node that is to be used in an important video conference. The configuration also has access to the segment resource database to provide the network operator with accurate information about the current state of the network.

Another important component of the LSRM is the segment monitor 84, which checks the priority level and source and destination addresses of all messages on the ring. The monitor compares this information with that contained in the segment resource database to confirm that there are no rogue nodes or applications transmitting at priority level 5 or 6 without approval from the LSRM, or that are exceeding their throughput allocation. If any irregularities are discovered, the segment monitor takes corrective action, firstly by notifying the local segment access agent of the node concerned, and then alerting the network operator.

In order for the taken ring segment to support coexisting applications of various types, all applications which use priority levels 5 or 6 must make the necessary reservation request to the LSRM, specifying their throughput requirements. Priority 5 users will be granted access if their throughput requirement can be fulfilled, and priority 6 users will be granted access if not only heir throughput requirement can be fulfilled, but also the overall latency of the ring is not degraded beyond a certain point. The overall latency for priority 6 users of the segment can be ensured by specifying a maximum token holding time for each of them.

Although the LSRM has been shown as residing essentially at a single terminal, it will be clear to those skilled in the art that it may be in fact be distributed over the network to provide increased robustness. For example, each node may contain a facility to directly access the segment resource database, which my be shared over the network, to examine available throughput, and reserve an appropriate amount. Likewise, the configuration utility and segment monitor applications may be installed on several nodes, although only active on one at any given time. These LSRM components (or indeed the whole LSRM) would then be started by the first multimedia workstation to make a request for a throughput allocation, but which fails to receive a response within a certain time-out period. Distributing the LSRM in such a manner avoids any single point of failure, or difficulties if the node containing the centralised LSRM is not powered on (in such a case conventional LAN applications would operate, but no multimedia communications could be performed).

We claim:

1. A method of operating a token ring local area network, in which a plurality of nodes are arranged in a ring configuration for circulating a token, a node communicating by sending a transmission over the network when it has control of the token, the network supporting at least three levels of communication, designated first, second and third in decreasing order of importance, wherein said first and second priority level communications require a guaranteed bandwidth and latency if important for said first priority level communications, but wherein said second priority level communications are relatively insensitive to latency, the network including a LAN segment resource manager (LSRM) for maintaining information about the first and second priority level communications currently in progress, the method comprising he steps of:

assigning maximum throughput allocations to the three priority levels, and storing said allocations in the LSRM;

sending a request from a node to the LSRM for permission to commence a first or second priority level communication, together with a desired throughput allocation;

determining at the LSRM whether or not to award the requesting node the desired throughput allocation, dependent on currently available throughput, and responding accordingly to the requesting node;

determining at the LSRM, for first priority level communications, the maximum time for which the requesting node can retain control of the token for a single transmission before release of the token, and responding accordingly to the requesting node;

recording at the LSRM any new allocation of throughput;

commencing communications at the requesting node in accordance with the response from the LSRM and monitoring at the LSRM communications on the token ring, and comparing the token ring communications with the recorded throughput allocations to verify that nodes are adhering to their throughput allocations.

2. The method of claim 1, further comprising the step of sending a notification from a node to the LSRM when any first or second priority level communication for that node has completed.

3. The method of claim 1, wherein the token includes a field to allow a first node desiring control of the token for a communication to make a reservation entry in the token, said reservation entry indicating the priority level of the desired communication, whereby no other nodes desiring to make communications at a priority level of lower importance than said indicated priority level may take control of the token until after said first node has completed the reserved communication.

4. The method of claim 1 or 2, further comprising the steps of the LSRM monitoring communications on the token ring, and comparing the results with the recorded throughput allocations to verify that nodes are adhering to their throughput allocations.

5. The method of claim 4, further comprising the step of any node supporting first and/or second priority level communications in addition to third priority level communications maintaining two queues of data to be transmitted, one for first and/or second priority level communications, and the other for third priority level communications.

6. The method of claim 5, wherein the LSRM reserves at least a certain portion of the total available throughput for priority level three communications.

7. The method of claim 6, wherein each node transmitting first and/or second priority level communications includes a local segment access agent (LSAA) performing he steps of:

assigning an identifier to each application at the node that has been granted a throughput allocation for first or second priority level communications; and monitoring outgoing first or second priority level communications to verify that they are associated with a correctly assigned identifier.

8. The method of claim 7, wherein the LSAA further performs the step of monitoring outgoing first priority level communications to ensure that any application at the node makes only one first priority level transmission within a predetermined maximum network latency period.

9. Apparatus for operating a token ring local area network, in which a plurality of nodes are arranged in a ring configuration for circulating a token, a node communicating by sending a transmission over the network when it has control of the token, the network supporting at least three priority levels of communication, designated first, second and third in decreasing order of importance, wherein said first and second priority level communications require a quaranteed bandwidth and latency is important for said first priority level communications, but wherein said second priority level communications are relatively insensitive to latency, the apparatus including:

a LAN segment resource manager (LSRM) for maintaining information about the first and second priority level communications currently in progress;

means for assigning maximum throughput allocations to the three priority levels, and storing said allocations in the LSRM;

means for sending a request from a node to the LSRM for permission to commence a first or second priority level communication, together with a desired throughput allocation;

means for determining at the LSRM whether or not to award the requesting node the desired throughput allocation, dependent on the currently available throughput, and responding accordingly to the requesting node;

means for determining a the LSRM, for first priority level communications, a maximum time for which the requesting node can retain control of the token for a single transmission before release of the token, and responding accordingly to the requesting node;

means for recording at the LSRM any new allocation of throughput;

means for commencing communications at the requesting node in accordance with the response from the LSRM; and means for monitoring at the LSRM communications on the token ring, and comparing the token ring communications with the recorded throughput allocations to verify that nodes are adhering to their throughput allocations.

* * * * *